(12) United States Patent
Egami et al.

(10) Patent No.: US 6,863,139 B2
(45) Date of Patent: Mar. 8, 2005

(54) ACCESSORY-DRIVING EQUIPMENT FOR AN AUTOMOTIVE VEHICLE

(75) Inventors: Tsuneyuki Egami, Gamagori (JP); Tomoya Katoh, Nogoya (JP); Jiro Asai, Okazaki (JP)

(73) Assignee: Denso Corporation, Kariya (JP)

( * ) Notice: Subject to any disclaimer, the term of this patent is extended or adjusted under 35 U.S.C. 154(b) by 148 days.

(21) Appl. No.: 10/419,875

(22) Filed: Apr. 22, 2003

(65) Prior Publication Data

US 2003/0209373 A1 Nov. 13, 2003

(30) Foreign Application Priority Data

May 10, 2002 (JP) .................................. 2002-134924

(51) Int. Cl.[7] .............................................. B60K 25/00
(52) U.S. Cl. ........................ 180/53.8; 477/3; 62/323.3
(58) Field of Search ............................. 180/53.8, 293, 180/65.3; 477/3; 62/323.3, 323.4; 123/179.4

(56) References Cited

U.S. PATENT DOCUMENTS

| | | | | |
|---|---|---|---|---|
| 5,549,174 A | * | 8/1996 | Reis | 180/165 |
| 5,558,173 A | | 9/1996 | Sherman | |
| 5,582,262 A | | 12/1996 | Wust | |
| 5,635,805 A | * | 6/1997 | Ibaraki et al. | 318/139 |
| 5,896,750 A | | 4/1999 | Karl | |
| 6,205,379 B1 | * | 3/2001 | Morisawa et al. | 701/22 |
| 6,501,190 B1 | * | 12/2002 | Seguchi et al. | 290/46 |
| 6,781,252 B2 | * | 8/2004 | Berels | 290/43 |
| 2002/0147531 A1 | | 10/2002 | Egami et al. | |
| 2002/0195285 A1 | | 12/2002 | Egami | |

FOREIGN PATENT DOCUMENTS

| | | |
|---|---|---|
| DE | 198 41 590 A 1 | 3/2000 |
| DE | 100 01 436 A 1 | 8/2000 |
| EP | 0 645 271 A2 | 3/1995 |
| JP | A 2000-229516 | 8/2000 |

OTHER PUBLICATIONS

U.S. Appl. No. 10/285,584, filed Nov. 1, 2002, Egami.

* cited by examiner

Primary Examiner—Paul N. Dickson
Assistant Examiner—Toan C To
(74) Attorney, Agent, or Firm—Oliff & Berridge, PLC

(57) ABSTRACT

Accessory-driving equipment connects an engine having an idle stop system, a motor-generator and an accessory including an air-conditioner compressor that is driven even at a time when the idle stop system is operated. The accessory is driven by the engine when the engine is running and driven by the motor-generator when the idle stop system is operated. The accessory-driving equipment includes a first shaft for connecting to the engine, a second shaft for connecting to the motor-generator, a third shaft for connecting to the accessory, a lock device for locking the third shaft and a clutch. The clutch and the lock device are operated so that a torque transmitted from the engine through the first shaft is distributed to the motor-generator and the accessory, or a torque is transmitted from the motor-generator to the engine.

13 Claims, 1 Drawing Sheet

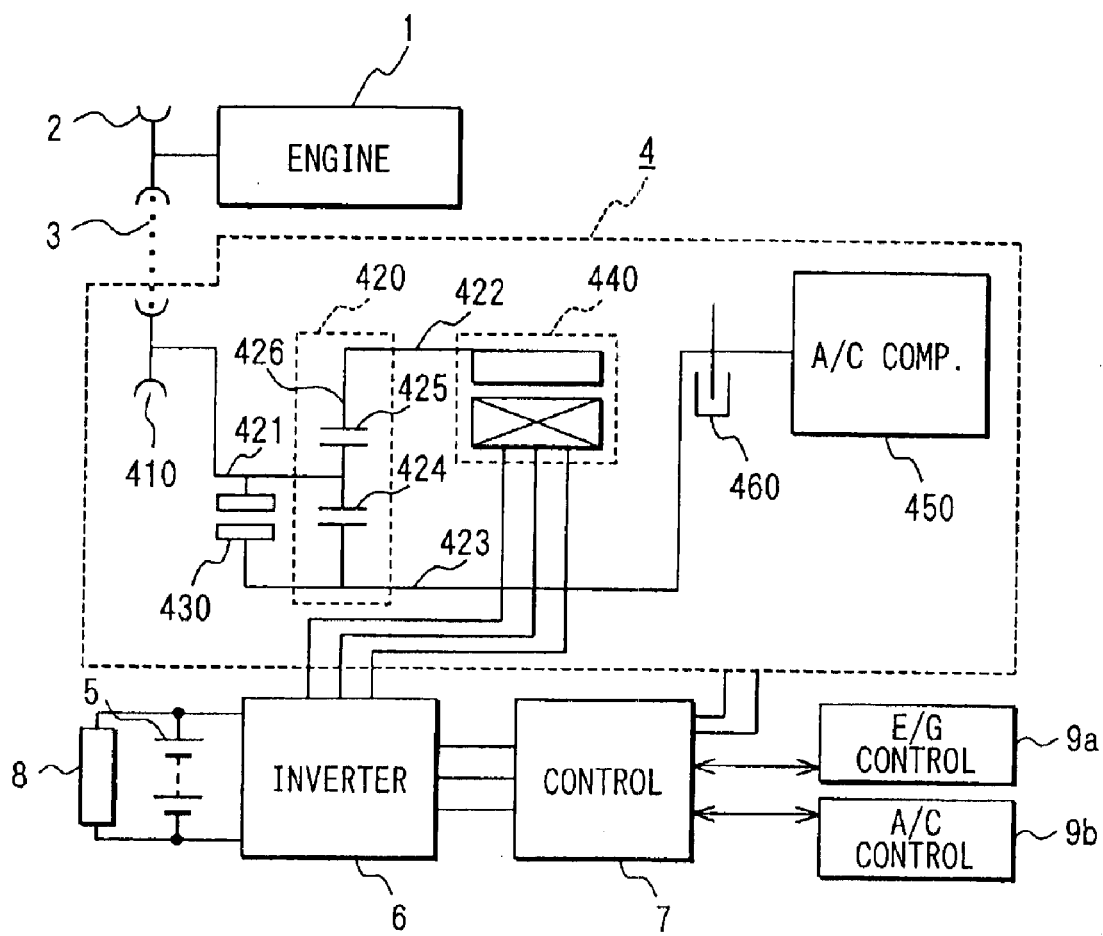

ACCESSORY-DRIVING EQUIPMENT FOR AN AUTOMOTIVE VEHICLE

CROSS REFERENCE TO RELATED APPLICATION

This application is based on Japanese Patent Application No. 2002-134924 filed on May 10, 2002, the disclosure of which is incorporated herein by reference.

FIELD OF THE INVENTION

The present invention relates to accessory-driving equipment for an automotive vehicle. More particularly, the present invention relates to accessory-driving equipment with a planetary gear system, which is used in the vehicle having an idle stop system.

BACKGROUND OF THE INVENTION

An automotive vehicle having an idle stop system has been proposed. The idle stop system is used as one of techniques to reduce a fuel consumption of an automotive vehicle, and stops an engine in the case of the engine idling at traffic lights so that the fuel consumption of the vehicle is reduced.

However, in this idle stop system, when an air-conditioner is required for operating, the idle stop system should not operate because the engine is required to drive an air-conditioner compressor. As a result, the idle stop system does not work effectively.

To solve the above problem, a hybrid compressor is proposed (JP-A-2000-229516). The hybrid compressor is a compressor integrated with a motor. When an engine is running, the engine drives the compressor. When the engine stops, a connection between the engine and the compressor is released so that the motor drives the compressor. However, the compressor in this prior art necessitates three rotary electric machines including an alternator. In some cases of this prior art, the compressor necessitates two inverters. Therefore, the construction of the hybrid compressor is much complex.

To solve this problem, another system is proposed in U.S. Pat. No. 5,896,750. In this system, a motor-generator and a compressor are connected to an engine by a belt through a one-way clutch.

However, this prior art has a problem that because the one-way clutch is mounted on a crankshaft pulley of the engine, the engine length becomes long. Accordingly, it is difficult to mount the engine in a front-engine/front-wheel-drive vehicle.

Considering these problems, the inventors have applied for patent (US 2002-0147531 A1). In this patent application, equipment includes a planetary gear system, which distributes a torque of a first shaft (i.e., a carrier) transmitted from an engine. The torque of the first shaft is distributed to a motor-generator connected to a second shaft (i.e., a ring gear) and a compressor connected to a third shaft (i.e., an sun gear). Further, the equipment includes a clutch disposed between the second shaft and the first shaft or between the second shaft and the third shaft, so that the third shaft can be locked by a lock system.

However, the accessory-driving equipment for an automotive vehicle with the planetary gear system has a difficulty that a reduction gear ratio of a motor-generator to the engine is limited to be small in the case of an engine starting. Therefore, it is difficult to start a large displacement engine by operating this accessory-driving equipment.

SUMMARY OF THE INVENTION

In view of the above-mentioned problem, it is an object of the present invention to provide accessory-driving equipment for an automotive vehicle that can be mounted on a large displacement engine. Moreover, the present invention has another object to provide the accessory-driving equipment that has an excellent mounting performance, a simple system structure and a low running cost.

According to the present invention, accessory-driving equipment for an automotive vehicle is provided. Here, the accessory-driving equipment connects an engine having an idle stop system, a motor-generator for an electric power generating operation and for an electric motor operation and an accessory including an air-conditioner compressor that is driven even at a time when the idle stop system is operated. The accessory is driven by the engine when the engine is running and driven by the motor-generator when the idle stop system is operated. The accessory-driving equipment includes a torque distribution system, a lock device and a clutch. The torque distribution system includes a first shaft for connecting to the engine, a second shaft for connecting to the motor-generator and a third shaft for connecting to the accessory. The lock device locks the third shaft.

The torque distribution system distributes a torque, which is transmitted from the engine through the first shaft, to the second shaft and the third shaft. The torque distribution system also transmits a torque from the second shaft to the first shaft. The clutch disengageably connects any two of the three shafts among the first shaft, the second shaft and the third shaft in the torque distribution system.

In this accessory-driving equipment, only one motor-generator can provide four operations that are an engine-start operation by the motor-generator, a compressor-drive operation in the case of the idle stop operation, a motor-generator-drive operation by the engine, and a motor-generator-drive and compressor-drive operation by the engine. The engine-start operation for starting the engine is performed by the motor-generator as a motor. The compressor-drive operation for driving the compressor is performed by the motor-generator as a motor. The motor-generator-drive operation for operating the motor-generator as a generator is performed by the engine. The motor-generator-drive and compressor-drive operation for operating both the motor-generator as a generator and the compressor is performed by the engine. Accordingly, a rotary electric machine and its driving circuit can be unified, so that the system structure becomes simple.

Moreover, the motor-generator, the accessory and the accessory-driving equipment can be disposed separately from the engine. Therefore, a total length of the engine can be shortened, and an arrangement of the engine in an engine compartment can be improved. Thus, a mounting performance, especially a mounting performance in a small-sized vehicle, can be improved.

In this equipment, the clutch and the lock device can be integrated, the clutch and the torque distribution system can be integrated, the lock device and the torque distribution system can be integrated, or the clutch, the lock device and the torque distribution system can be integrated. Further, the motor-generator and the torque distribution system can be integrated so that a rotary electric machine with a torque distribution system is provided. Further, the clutch, the lock device, the compressor, the motor-generator and the torque distribution system can be integrated so that an integrated rotary electric machine is provided. A synchronous motor-generator can be used as the motor-generator. A brake system can be used as the lock device.

Preferably, the torque distribution system includes a planetary gear system. Moreover, a differential gear system, Ravigneaux type planetary gear system, or a planetary roller system can be used as the torque distribution system. This torque distribution system can be simplified, minimized, and lightened, because the planetary gear system is used as the torque distribution system, which has simple structure. Moreover, the reduction gear ratio of the motor-generator to the engine can be enlarged. Thus, even a large displacement engine can be started by the motor-generator using this accessory-driving equipment.

More preferably, the planetary gear system includes a carrier, a sun gear, and a ring gear. The first shaft connects to the carrier. The second shaft connects to the sun gear. The third shaft connects to the ring gear. In this planetary gear system, a rotational moment of a rotational portion in the torque distribution system, which rotates with the motor-generator at high speed, can be reduced. Further, the motor-generator can be readily disposed adjacent to the sun gear, so that the rotational shaft of the motor-generator connects to the sun gear. Thus a total length of the motor-generator becomes short. Accordingly, the equipment can be compact.

Further, in the planetary gear system, a gear ratio of the sun gear to the ring gear is set in the range between 0.25 and 0.35. In this gear ratio, a torque for starting the engine can be enlarged.

Preferably, the accessory-driving equipment further includes a control unit. The control unit controls both the clutch and the lock device such that the clutch is disengaged and the lock device locks when the engine is started by the motor-generator, the clutch is disengaged and the lock device unlocks when the air-conditioner compressor is driven by the motor-generator, and the clutch is engaged and the lock device unlocks when the engine is running. Thus, the above four operations can be performed by only one control unit for controlling both the clutch and the lock device, so that the accessory-driving equipment with this control unit can be operated at a low cost.

BRIEF DESCRIPTION OF THE DRAWINGS

The above and other objects, features and advantages of the present invention will become more apparent from the following detailed description made with reference to the accompanying drawings. In the drawings:

FIG. 1 is a block diagram showing accessory-driving equipment according to a first embodiment of the present invention; and FIG. 2 is a table showing an operation mode of the accessory-driving equipment according to the first embodiment.

DETAILED DESCRIPTION OF THE PREFERRED EMBODIMENT

Accessory-driving equipment according to an embodiment is used for an automotive vehicle having an idle stop system. As shown in FIG. 1, the accessory-driving equipment connects an internal combustion engine 1 having an idle stop system and a motor-generator and accessory system 4. Specifically, the engine 1 is connected to the motor-generator and accessory system 4 with a crankshaft pulley 2, a belt 3, an input pulley 410 and the accessory-driving equipment. The belt 3 transmits a driving force generated by the engine 1 from the crankshaft pulley 2 to the external system, for example, the motor-generator and accessory system 4. The input pulley 410 is connected with the crankshaft pulley 2 through the belt 3 in the engine 1. The motor-generator and accessory system 4 includes a motor-generator 440 and an air-conditioner compressor 450. The accessory-driving equipment includes a planetary gear system 420, a clutch 430 and a lock device 460.

The motor-generator 440 is controlled by electric equipment, which includes an electric storage device 5, an inverter 6, a control unit 7 and an electric load 8. A secondary battery, for example, can be used as the electric storage device 5. The inverter 6 has a two-way working function for converting direct current to alternating current and alternating current to direct current. The inverter 6 delivers electric power between the electric storage device 5 and the motor-generator 440 in the motor-generator and accessory system 4. The control unit 7 selects a mode among a starter mode, an electric air-conditioner mode, a normal mode, and the like in accordance with information about an engine control unit 9a, an air-conditioner control unit 9b, and the like. Thus, the control unit 7 controls the inverter 5, the clutch 430 and the lock device 460 in the motor-generator and accessory system 4. The electric storage device 5 supplies electric power to the electric load 8.

The planetary gear system 420 provides a torque distribution system, and includes a first shaft 421 (i.e., an engine connection shaft), a second shaft 422 (i.e., a motor-generator connection shaft), a third shaft 423 (i.e., an accessory connection shaft), a ring gear 424, a carrier 425 and a sun gear 426.

The carrier 425 is fixed to the first shaft 421, and the first shaft 421 directly connects to the input pulley 410. The sun gear 426 is fixed to the second shaft 422, and the second shaft 422 directly connects to a rotational shaft of the motor-generator 440. The ring gear 424 is fixed to the third shaft 423, and the third shaft 423 connects to the air-conditioner compressor 450 through the lock device 460, which locks the rotation of the rotational shaft of the motor-generator 440. Moreover, the ring gear 424 connects to the first shaft 421 through the clutch 430.

Ordinary planetary gear system can be used as the planetary gear system 420 in this embodiment. In the planetary gear system 420, the sun gear 426 and the ring gear 424 are engaged to the planetary gear, respectively. The planetary gear is supported rotatably to the carrier 425. The carrier 425 rotates in accordance with the planetary gear revolving around the sun gear 426.

The planetary gear system 420, the clutch 430 and the lock device 460 provide a transmitting device. The clutch 430 is engaged and disengaged (i.e., connected and disconnected) so that the clutch 430 switches one of a case where the first shaft 421 and the third shaft 423 in the planetary gear system 420 rotate simultaneously and a case where the first shaft 421 and the third shaft 423 are disconnected. An electromagnetic type or hydraulic type clutch can be used as the clutch 430.

The motor-generator 440 is a synchronous motor-generator. An ordinary air-conditioner compressor for an automotive vehicle is used as the compressor 450. A brake system is used as the lock device 460.

Next, an operation of this accessory-driving equipment is explained with using FIG. 2, which is a table showing an operation mode.

1. Starter Mode

When the vehicle stops, for example, at traffic lights, the engine 1 automatically stops by the idle stop operation, in which fuel supply to the engine 1 is interrupted. After that, to start the engine 1, the accessory-driving equipment is operated. In other words, the starter mode means that the engine 1 starts from the idle stop operation.

In this starter mode, at first, the clutch 430 is disengaged and the lock device 460 locks the third shaft. In this case, the third shaft 423 and the ring gear 424 in the planetary gear system 420 are prohibited from rotating. The rotational shaft of the motor-generator 440 is mechanically connected to the input pulley 410 through the sun gear 426, the planetary gear, and the carrier 425, in this order. The control unit 7 controls the inverter 5 to operate the motor-generator 440 electrically as a motor, so that the motor-generator 440 generates a starting torque, and then the engine 1 receives the starting torque from the motor-generator 440 through the accessory-driving equipment. A rotational speed of the carrier 425 is smaller than that of the sun gear 426, so that the electrical torque of the motor-generator 440 is magnified and supplies a large starting torque to the engine 1. Therefore, in the starter mode, the motor-generator 440 drives the engine 1 for starting.

2. Electric Air-Conditioner Mode

When the air-conditioner operates in the case where the engine 1 stops by the idle stop operation, the motor-generator 440 electrically drives the compressor 450 for operating the air-conditioner. At first, the control unit 7 controls the inverter 6 to generate and to supply alternating electric power to the motor-generator 440 so that the motor-generator 440 generates a sufficient torque for rotating the compressor 450.

In this case, the clutch 430 is disengaged and the lock device 460 unlocks the third shaft, so that the motor-generator 440 is electrically operated as a motor to drive the compressor 450 even in the engine stop. A friction loss of the engine 1 measured from the sun gear side is much larger than a driving torque of the compressor 450 measured from the sun gear side. Therefore, the torque from the motor-generator 440 is smaller than the revolving torque of the carrier 425, so that the carrier 425 cannot revolve. Accordingly, the torque of the motor-generator 440 is transmitted to the compressor 450 through the second shaft 422, the sun gear 426, the rotating planetary gear, the ring gear 424 and the third shaft 423.

3. Normal Mode

After the engine 1 is started completely, the control unit 7 controls the inverter 7 so that the motor-generator 440 generates electric power. The electric power generated by the motor-generator 440 is rectified at the inverter 5. Then, the electric power having been rectified charges the electric storage device 6, and is supplied to the electric load 8.

In this case, the clutch 430 is engaged and the lock device 460 unlocks the third shaft 423. Thus, the ring gear 424 rotates in accordance with the carrier 425 revolving.

Accordingly, an input torque transmitted from the engine 1 to the carrier 425 is distributed to the sun gear 426 and the ring gear 424 through the carrier 425. The input torque distributed to the sun gear 426 drives the motor-generator 440 so that the motor-generator 440 generates the electric power. The input torque distributed to the ring gear 424 drives the compressor 450 so that the air conditioner is operated. Therefore, both the electric power generating operation and the compressor-drive operation are simultaneously performed. However, when the air conditioner is not required to operate and also the compressor is not operated, only the electric power generating operation can be performed by this accessory-driving equipment.

A ratio of a driving torque of the motor-generator 440 to a driving torque of the compressor 450 in accordance with the input torque is determined by a ratio of a loading torque of the motor-generator 440 to a loading torque of the compressor 450 measured from the carrier side. The loading torque of the motor-generator 440 is controllable, for example, by controlling the electric power generating operation with using the battery voltage. The loading torque of the compressor 450 is also controllable by controlling the discharge of the compressor 450.

In this equipment, when the engine 1 is started, a torque generated by the motor-generator 440 can be transmitted with reduced speed from the sun gear 426 to the engine 1 through the carrier 425 without driving the compressor 450. When the electric air-conditioner is operated, the torque generated by the motor-generator 440 can be transmitted with reduced speed from the sun gear 426 to the ring gear 424 through the carrier 425 that rotates only and does not revolve (because of the engine friction). When the engine 1 is running, the carrier 425, which rotates with the ring gear 424 integrally, drives the compressor 450, and also drives the motor-generator 440 through the sun gear 426 so that electric power is generated.

Therefore, only one motor-generator 440 can provide four operations that are an engine-start operation by the motor-generator 440, a compressor-drive operation in the case of the idle stop operation, a motor-generator-drive operation by the engine 1, and a motor-generator-drive and compressor-drive operation by the engine 1. Here, the engine-start operation corresponds to the starter mode, the compressor-drive operation corresponds to the electric air-conditioner mode, and the motor-generator-drive operation and the motor-generator-drive and compressor-drive operation correspond to the normal mode. Accordingly, a rotary electric machine and its driving circuit can be unified, so that the system structure becomes simple.

Moreover, the motor-generator and accessory system 4 and the accessory-driving equipment, which includes the compressor 450, the motor-generator 440, the planetary gear system 420, the clutch 430 and the lock system 460, can be disposed separately from the engine 1. Therefore, a total length of the engine 1 can be shortened, and an arrangement of the engine 1 in an engine compartment can be improved. Thus, a mounting performance, especially a mounting performance in a small-sized vehicle, can be improved.

Further, the torque distribution system can be simplified, minimized, and lightened, because the planetary gear system 420 is used as the torque distribution system, which has simple structure. Further, the reduction gear ratio of the motor-generator 440 to the engine 1 can be enlarged.

Further, the rotational shaft of the motor-generator 440 is fixed to the sun gear 426. Here, the rotational shaft of the motor-generator 440 rotates at the highest speed, and is applied with the smallest torque. The sun gear 426 has the smallest number of gear teeth. Therefore, a rotational moment of a rotational portion in the torque distribution system, which rotates with the motor-generator 440 at high speed, can be reduced.

Furthermore, the motor-generator 440 can be readily disposed adjacent to the sun gear 426, so that the rotational shaft of the motor-generator 440 connects to the sun gear 426. Thus a total length of the motor-generator 440 becomes short. Accordingly, the equipment can be compact.

(Modification)

Preferably, the planetary gear system has a gear ratio of the sun gear to the ring gear (i.e., the number of gear teeth in the sun gear divided by the number of gear teeth in the ring gear) that is set in the range between 0.25 and 0.35. In this gear ratio, a torque for starting the engine 1 can be enlarged moderately.

Although the clutch 430 disengageably connects the first shaft 421 and the third shaft 423 in the planetary gear system 420, the clutch 420 can disengageably connect the first shaft 421 and the second shaft 422. Further, the clutch 430 can disengageably connect the second shaft 422 and the third shaft 423.

Further, the clutch 430 and the lock device 460 can be integrated, the clutch 430 and the planetary gear system 420 can be integrated, the lock device 460 and the planetary gear system 420 can be integrated, and the above three systems can be integrated, respectively. Moreover, the motor-generator 440 and the planetary gear system 420 can be integrated, and the lock device 460 and the compressor 450 can be integrated. A rotary electric machine integrated with a planetary gear system can provide the planetary gear system 420 and the motor-generator 440. Moreover, the clutch 430, the lock device 460, and the compressor 450 can be connected or integrated to the rotary electric machine.

Although the motor-generator 440 is a synchronous motor-generator in this embodiment, other types of rotary electric machine can be used as the motor-generator 440 as long as the rotary electric machine can switch an electric power generating operation and an electric motor operation.

In the above embodiment, the planetary gear system 420 is used as the torque distribution system. However, a differential gear system can be used. Further, Ravigneaux type planetary gear system can be used as the planetary gear system. Furthermore, a planetary roller system can be used instead of the planetary gear system.

What is claimed is:

1. Accessory-driving equipment for an automotive vehicle, which connects an engine having an idle stop system, a motor-generator for an electric power generating operation and for an electric motor operation, and an accessory including an air-conditioner compressor that is driven even at a time when the idle stop system is operated, the accessory being driven by the engine when the engine is running and driven by the motor-generator when the idle stop system is operated, the equipment comprising:
   a torque distribution system including a first shaft for connecting to the engine, a second shaft for connecting to the motor-generator, and a third shaft for connecting to the accessory;
   a lock means for locking the third shaft; and
   a clutch,
   wherein the torque distribution system distributes a torque to the second shaft and the third shaft, the torque being transmitted from the engine through the first shaft, and transmits a torque from the second shaft to the first shaft, and
   wherein the clutch disengageably connects any two of the three shafts among the first shaft, the second shaft, and the third shaft in the torque distribution system.

2. Accessory-driving equipment for an automotive vehicle, according to claim 1,
   wherein the torque distribution system includes a planetary gear system.

3. Accessory-driving equipment for an automotive vehicle, according to claim 2,
   wherein the planetary gear system includes a carrier, a sun gear, and a ring gear,
   wherein the first shaft is connectable to the carrier,
   wherein the second shaft is connectable to the sun gear, and
   wherein the third shaft is connectable to the ring gear.

4. Accessory-driving equipment for an automotive vehicle, according to claim 1, further comprising:
   a control unit,
   wherein the control unit controls the clutch such that the clutch is disengaged when the engine is started or when the air-conditioner compressor is driven, and is engaged when the engine is running, and
   wherein the control unit controls the lock means such that the lock means locks when the engine is started, and unlocks when the engine is running or when the air-conditioner compressor is driven.

5. Accessory-driving equipment for an automotive vehicle, according to claim 3,
   wherein the planetary gear system has a gear ratio of the sun gear to the ring gear that is set in the range between 0.25 and 0.35.

6. Accessory-driving equipment for an automotive vehicle, according to claim 1,
   wherein the torque distribution system is a differential gear system, Ravigneaux type planetary gear system, or a planetary roller system.

7. Accessory-driving equipment for an automotive vehicle, according to claim 1,
   wherein the motor-generator and the torque distribution system are integrated so that a rotary electric machine with a torque distribution system is provided.

8. Accessory-driving equipment for an automotive vehicle, according to claim 1,
   wherein the clutch, the lock means, the compressor, the motor-generator, and the torque distribution system are integrated so that an integrated rotary electric machine is provided.

9. Accessory-driving equipment for an automotive vehicle, according to claim 1,
   wherein the motor-generator is a synchronous motor-generator.

10. Accessory-driving equipment for an automotive vehicle, according to claim 1,
    wherein the lock means is a brake system.

11. Accessory-driving equipment for an automotive vehicle, which connects an engine having an idle stop system, a motor-generator for an electric power generating operation and for an electric motor operation, and an accessory including an air-conditioner compressor that is driven even at a time when the idle stop system is operated, the accessory being driven by the engine when the engine is running and driven by the motor-generator when the idle stop system is operated, the equipment comprising:
    a torque distribution system including a first shaft for connecting to the engine, a second shaft for connecting to the motor-generator, and a third shaft for connecting to the accessory;
    a lock means for locking the third shaft; and
    a clutch,
    wherein the clutch disengageably connects any two of the three shafts among the first shaft, the second shaft and the third shaft in the torque distribution system,
    wherein the torque distribution system distributes a torque to the second shaft and the third shaft, the torque being transmitted from the engine through the first shaft, and transmits a torque from the second shaft to the first shaft, and wherein the torque distribution system includes a planetary gear system that includes a carrier, a sun gear and a ring gear, wherein the first shaft is connectable to the carrier, wherein the second shaft is connectable to the sun gear, and wherein the third shaft is connectable to the ring gear.

12. Accessory-driving equipment for an automotive vehicle, according to claim 11, wherein the sun gear has a least gear teeth among the planetary gear system, and is fixed to the second shaft for connecting to the motor-generator that rotates high speed and small torque so that a reduction gear ratio of the motor-generator to the engine becomes large.

13. Accessory-driving equipment for an automotive vehicle, according to claim 12, wherein the planetary gear system has a gear ratio of the sun gear to the ring gear that is set in the range between 0.25 and 0.35 so that a starting torque for starting the engine becomes large.

* * * * *